(12) United States Patent
Olson (10) Patent No.: US 7,818,196 B2
(45) Date of Patent: Oct. 19, 2010

(54) REAL TIME ESTIMATION OF ROLLING AVERAGES OF CUMULATIVE DATA

(75) Inventor: Jeffrey James Olson, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 1376 days.

(21) Appl. No.: 11/151,940

(22) Filed: Jun. 13, 2005

(65) Prior Publication Data

US 2006/0282301 A1    Dec. 14, 2006

(51) Int. Cl.
*G06F 15/02* (2006.01)
(52) U.S. Cl. .............. 705/9; 705/7; 705/8; 379/111
(58) Field of Classification Search ........... 705/7–10; 379/111
See application file for complete search history.

(56) References Cited

U.S. PATENT DOCUMENTS

| | | | | |
|---|---|---|---|---|
| 5,206,903 | A * | 4/1993 | Kohler et al. | 379/265.12 |
| 5,550,964 | A * | 8/1996 | Davoust | 345/440 |
| 5,621,789 | A * | 4/1997 | McCalmont et al. | 379/265.06 |
| 5,754,449 | A * | 5/1998 | Hoshal et al. | 702/187 |
| 5,926,822 | A * | 7/1999 | Garman | 715/201 |
| 5,948,065 | A * | 9/1999 | Eilert et al. | 709/226 |
| 5,993,057 | A * | 11/1999 | Gulick et al. | 714/814 |
| 6,173,053 | B1 * | 1/2001 | Bogart et al. | 379/266.01 |
| 6,526,397 | B2 * | 2/2003 | Chee et al. | 707/1 |
| 6,654,780 | B1 * | 11/2003 | Eilert et al. | 718/104 |

FOREIGN PATENT DOCUMENTS

JP    2003-198736    7/2003

OTHER PUBLICATIONS

Basics of Weighted Moving Averages (John Devcic, http://investopedia.com/printable.asp?a=/articles/technical/060401.asp), retrieved from http://web.archive.org/web/*/http://www.investopedia.com/articles/technical/060401.asp.*
Sliding-window filtering: an efficient algorithm for incremental mining Chang-Hung Lee, Cheng-Ru Lin, Ming-Syan Chen Oct. 2001 CIKM '01: Proceedings of the tenth international conference and knowledge management.*

(Continued)

*Primary Examiner*—Beth V Boswell
*Assistant Examiner*—Alan Miller
(74) *Attorney, Agent, or Firm*—Sheridan Ross P.C.

(57) ABSTRACT

The present invention is directed to techniques for determining a value of a cumulative datum during a selected time interval. The disclosed method and system for collecting contact center data includes a plurality of agent and work item queues and a workflow server for distributing work items to available agents; and an event processor, that, for a selected a base time interval for accumulating a cumulative datum, determines a the rolling window that is at least one of equal and greater than the base interval and being an integer multiple of the base interval, and, when the rolling window partly spans a prior base interval, the processor can determine a rolling average for the cumulative datum over the width of the rolling window and, when the roiling window partly spans a prior base interval, the processor can estimate a value for the cumulative datum in the partly spanned prior base interval.

21 Claims, 8 Drawing Sheets

OTHER PUBLICATIONS

Building a Real-Time Data Server in Excel 2002 (http://msdn.microsoft.com/en-us/library/aa140059(office.10,printer).aspx).*
Office Letter (including translation) for Japanese Patent Application No. 2006-163219, mailed Mar. 4, 2009.
European Search Report and Opinion for European Patent Application No. 06251746.1, mailed Sep. 1, 2006.
First Examination Report for Indian Patent Application No. 1024/CHE/2006, mailed Mar. 17, 2008.
Background for the above-referenced application (previously provided).
"Leaky Bucket Counter," prepared by ATIS Committee T1A1 (Feb. 28, 2001), available at http://www.atis.org/tg2k/_leaky_bucket_counter.html, 1 page.
"The Token Bucket (Leaky Bucket) Model," (undated), 5 pages, printed Jun. 13, 2005.
Martin A. Brown, "Single Leaky Bucket Meter," (Nov. 6, 2003), available at http://linux-ip.net/gl/tcng/node54.html, 2 pages.
Jon Murphy, "Conformance Definition—Leaky Bucket," (Sep. 28, 1996), available at http://www.eeng.dcu.ie/~murphyj/the/the/node75.html, 3 pages.
"Traffic Management—The Generic Cell Rate Algorithm," CIS777 Lab Assignment I (May 6, 1997), pp. 1-7.
Eric W. Weisstein, "Moving Average," *MathWorld—A Wolfram Web Resource* (1999), available at http://mathworld.wolfram.com/MovingAverage.html, 2 pages.
"CentreVu® Report Designer User Guide," Avaya Communication, 585-210-930 Comcode 108869041, Issue 2 (Apr. 2001), pp. 1-1-18-24.
"Avaya Call Management System (CMS) Custom Reports," Avaya Communication, 585-215-822 Comcode 105501867, Issue 3.0 (May 2002), pp. 1-180.

* cited by examiner

REAL TIME ESTIMATION OF ROLLING AVERAGES OF CUMULATIVE DATA

FIELD

The invention relates generally to contact centers and particularly to monitoring selected contact center objects to evaluate contact center operations.

BACKGROUND

In contact centers today, there is an increasing need for contact center supervisors to monitor the performance of agents in real time. This can be important not only to ensure that selected sets of customer contacts (e.g., gold, silver, and bronze customers) are receiving an appropriate level of service but also to reward and discipline agents based on their performance and to evaluate agent staffing needs by skill/split at any point during the day.

To provide such monitoring, there are many products on the market including Operational Analyst™ and Call Management System™ by Avaya, Inc. To effectively monitor the contact center, these products must track a myriad of cumulative data objects, including the number of contacts handled by each agent, the amount of time required by each agent to service a contact, the wait time for sets of enqueued contacts and for individual contacts, and the like. A "cumulative datum" is a sum that grows and/or stays the same in magnitude over a selected measurement (e.g., time) interval; it commonly does not decrease in magnitude over the interval. Real time monitoring of these objects is made difficult by the limited memory available to store real time event information.

Figure 4:
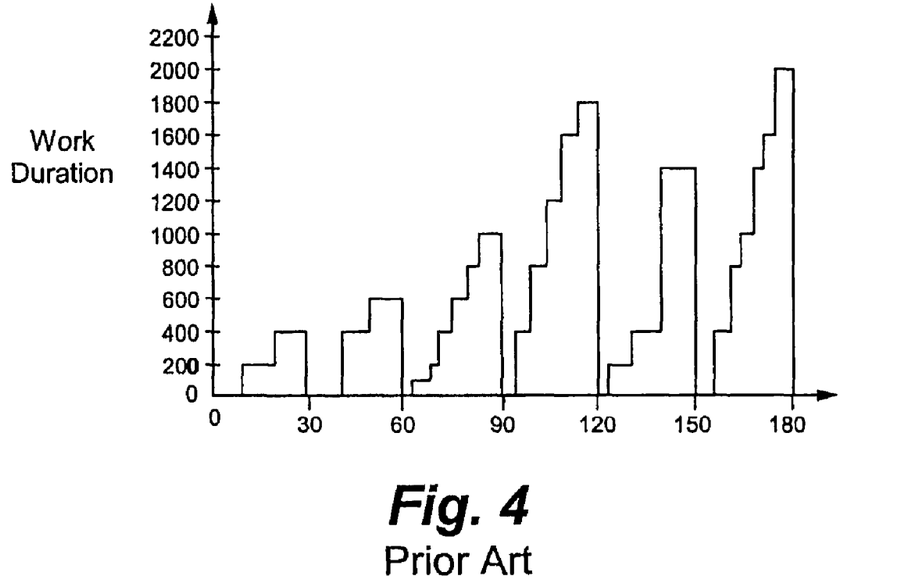
FIG. 4 is a plot of work duration (vertical axis) against time (minutes) (horizontal axis) showing the prior art practice of ratcheting.

To accommodate the limited memory and provide some level of meaningful object tracking, "ratcheting" is widely used by contact centers management systems to control the magnitude of cumulative data. Referring to FIG. 4, the basic measures are monitored continuously and reset to zero at each 30-minute time interval. In the next successive interval, the measure restarts the count from zero. In this way, the cumulative datum is converted into a series of summary measurements at fixed intervals of time.

Ratcheting can have a number of problems.

First, after being reset to zero following each measured time interval there is effectively no measurement available to administrators until additional events have been counted. This practice has been likened by administrators to piloting an airplane in which all of the instruments are periodically reset to zero. Administrators feel like they are flying blind until the real-time data begins to increase in magnitude.

Second, the problem above is magnified whenever the ratio of two cumulative measures is being computed in real time. For example, if the administrator wants to monitor the average time agents are talking on a call that would be the ratio of cumulative talk time (numerator) to the cumulative number of calls (denominator). But ratcheting resets both the numerator and denominator to zero periodically so (a) the ratio cannot even be computed until the denominator becomes non zero and (b) the ratio fluctuates wildly until both numerator and denominator accumulate sufficient counts to be representative. These spurious fluctuations severely limit the ability to set meaningful thresholds for automatic triggering of notifications or corrective actions.

It would be desirable to provide to administrators the magnitude of the measured cumulative datum in a rolling window of time rather than since the datum was last reset to zero. For example, where the measured object is the number of answered phone calls it would be valuable to know not only the number of calls answered since the most recent half hour boundary but also the number of calls answered in the last thirty minutes.

SUMMARY

These and other needs are addressed by the various embodiments and configurations of the present invention. The present invention is directed to techniques for determining a value of a cumulative datum during a selected interval.

In one embodiment, a contact center monitoring method is provided that includes the steps of:

(a) selecting a base time interval for accumulating a cumulative datum and a width of a rolling window, the width of the rolling window being at least one of equal to and greater than the base interval and an integer multiple of the base interval;

(b) performing at least one of the following steps:

(b1) when the rolling window partly spans a prior base interval, determining a rolling average for the cumulative datum over the width of the rolling window; and (b2) when the rolling window partly spans a prior base interval, estimating a value for the cumulative datum in the partly spanned prior base interval.

In one configuration, the estimating step is performed according to the equation: Cumulative datum value over rolling window=currently accumulated value+cumulative datum value(s) for any intermediate base interval (spanned fully by the rolling window)+(weighting factor)(cumulative datum value over the partly spanned prior base interval). The weighting factor is assumed to vary over the partly spanned interval in a determined manner, such as linearly or quadratically. The weighting factor can produce a rolling average of cumulative data in real time from current and previous ratcheted data without having to save or use the detailed changes in the data.

The present invention can provide a number of advantages. For example, the present invention can solve the problem inherent in instantaneous ratcheted data by including a weighted contribution from previous ratcheted values. The result can contain no artificial resets to zero so ratios can be computed without incurring delays or spurious fluctuations after crossing an interval boundary. This permits meaningful thresholds to be set for triggering notifications or corrective actions in real time. It also can avoid the storing of the detailed arrival times of the underlying individual events. The preferred configuration of the present invention can use only the ratcheted summary values of the current and previous time intervals without further reference to or storage of the event details. The preferred configuration can also be well suited to database environments, such as used in contact center reporting products, in which millions of cumulative data items are being recorded in parallel. In such cases, the rolling average of the preferred embodiment can be computed using industry standard data access commands in Structured Query Language (SQL) by creating a single database cell containing the time dependent weighting factor as a floating real point number. The same weighting factor is then used to compute rolling averages for millions of distinct cumulative data items. The arithmetic of the preferred embodiment is simple and readily adaptable to database or third party transformation or reporting tools. No additional database is commonly required to provide up-to-the-moment rolling averages, since existing contact center databases generally already provide current and previous interval data for cumulative items. Thus, the proposed invention can be ideally suited for retrofitting existing ratchet-based systems to provide rolling averages.

While the ratcheting products of the prior art can provide an accurate moving average over a window completely spanning one or more intervals and not spanning only part of a prior interval, they provide sums that amount to running averages over windows that grow in size from zero width up to the width of the base interval (rather than the constant width of the present invention). Furthermore, the varying effective width of ratcheted data solutions can result in fluctuations that thwart the use of sensitive thresholds for triggering notifications or corrective actions.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

As used herein, "at least one . . . and", "at least one . . . or", "one or more of . . . and", "one or more of . . . or", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide improved contact processing.

Figure 1:
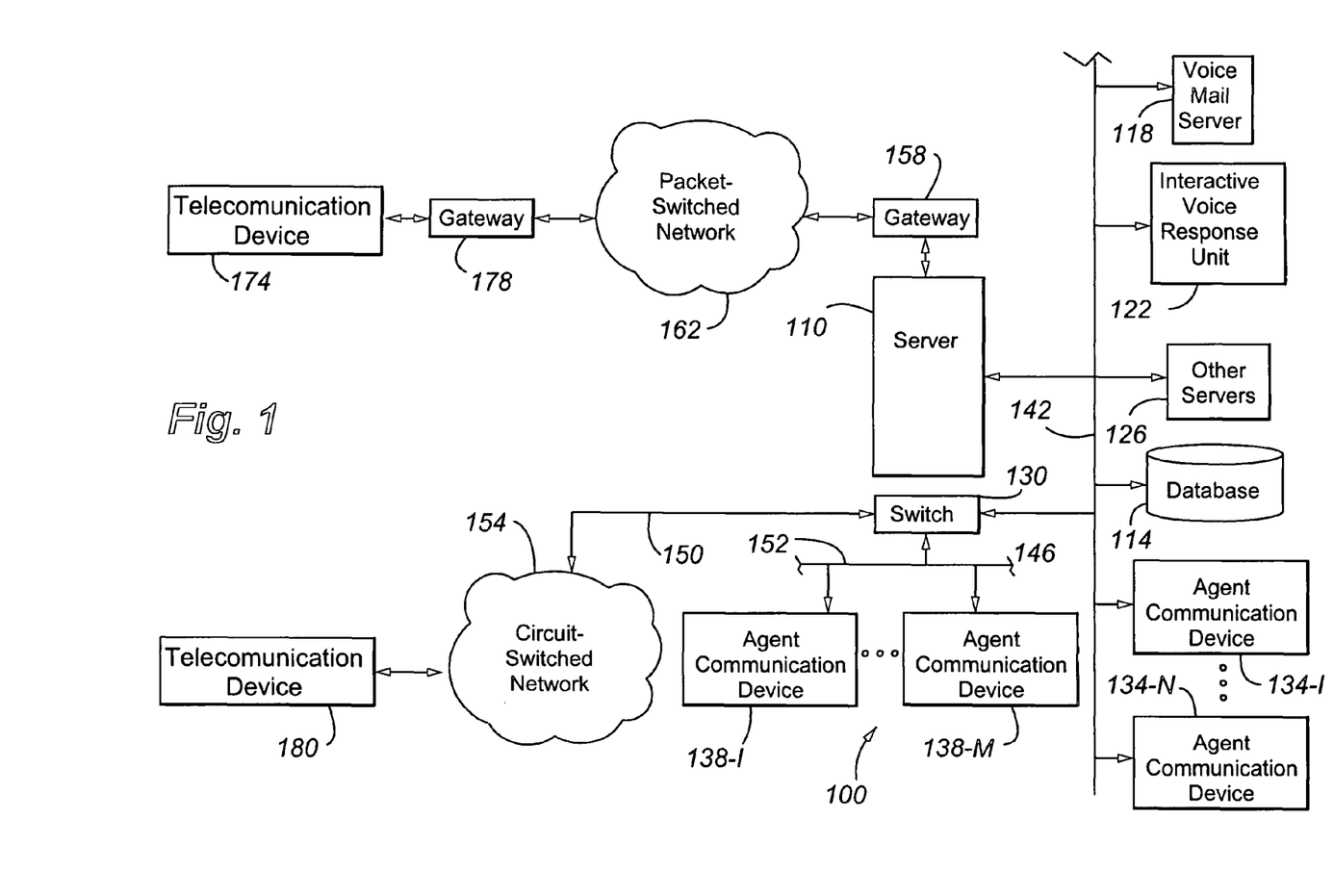
FIG. 1 is a block diagram of a contact center according to an embodiment of the present invention.

FIG. 1 shows an illustrative embodiment of the present invention. A contact center 100 comprises a central server 110, a set of data stores or databases 114 containing contact or customer related information and other enterprise information, and a plurality of servers, namely a voice mail server 118, an Interactive Voice Response unit or IVR 122, and other servers 126, a switch 130, a plurality of working agents operating packet-switched (first) telecommunication devices 134-1 to N (such as wired and/or wireless computer work stations or personal computers), and/or circuit-switched (second) telecommunication devices 138-1 to M (such as wired and/or wireless analog or digital telephones), all interconnected by a local area network LAN (or wide area network WAN) 142. The servers can be connected via optional communication lines 146 to the switch 130. Alternatively, the switch functionality may be integrated into the functionality of the server 110. As will be appreciated, the other servers 126 can also include a scanner (which is normally not connected to the server 110 or Web server), VoIP software, video contact software, voice messaging software, an IP voice server, a fax server, a web server, and an email server) and the like. The switch 130 is connected via a plurality of trunks 150 to the Public Switch Telecommunication Network or PSTN 154 and via link(s) 152 to the second telecommunication devices 138-1 to M. A gateway 158 (such as Avaya Inc.'s, G700 Media Gateway™) is positioned between the server 110 and the packet-switched network 162 to process communications passing between the server 110 and the network 162.

The media server 110 (which preferably includes the functionality of the switch 130) can be any converged architecture for directing circuit-switched and/or packet-switched customer contacts to one or more communication devices. Typically, the server is a stored-program-controlled system that conventionally includes interfaces to external communication links, a communications switching fabric, service circuits (e.g., tone detectors and generators, etc.), memory for storing control programs and data, and a processor (i.e., a computer) for executing the stored control programs to control the interfaces and the fabric and to provide automatic contact-distribution functionality. Features provided by the media server typically include not only telephony features and intelligent contact routing but also localization, collaboration, mobility, messaging, system management, attendant features, networking, and application programming interfaces. The server typically includes a network interface card (not shown) to provide services to the serviced telecommunication devices.

Illustratively, the media server 110 can be a modified form of the following subscriber-premises equipment: Avaya Inc.'s Definity™ Private-Branch Exchange (PBX)-based ACD system; Avaya Inc.'s IP600™ LAN-based ACD system, or an S8100™, S8300™, S8500™, S8700™, or S8710™ media server running a modified version of Avaya Inc.'s Communication Manager™ voice-application software with call processing capabilities and contact center functions. Other types of known switches and servers are well known in the art and therefore not described in detail herein.

Figure 2:
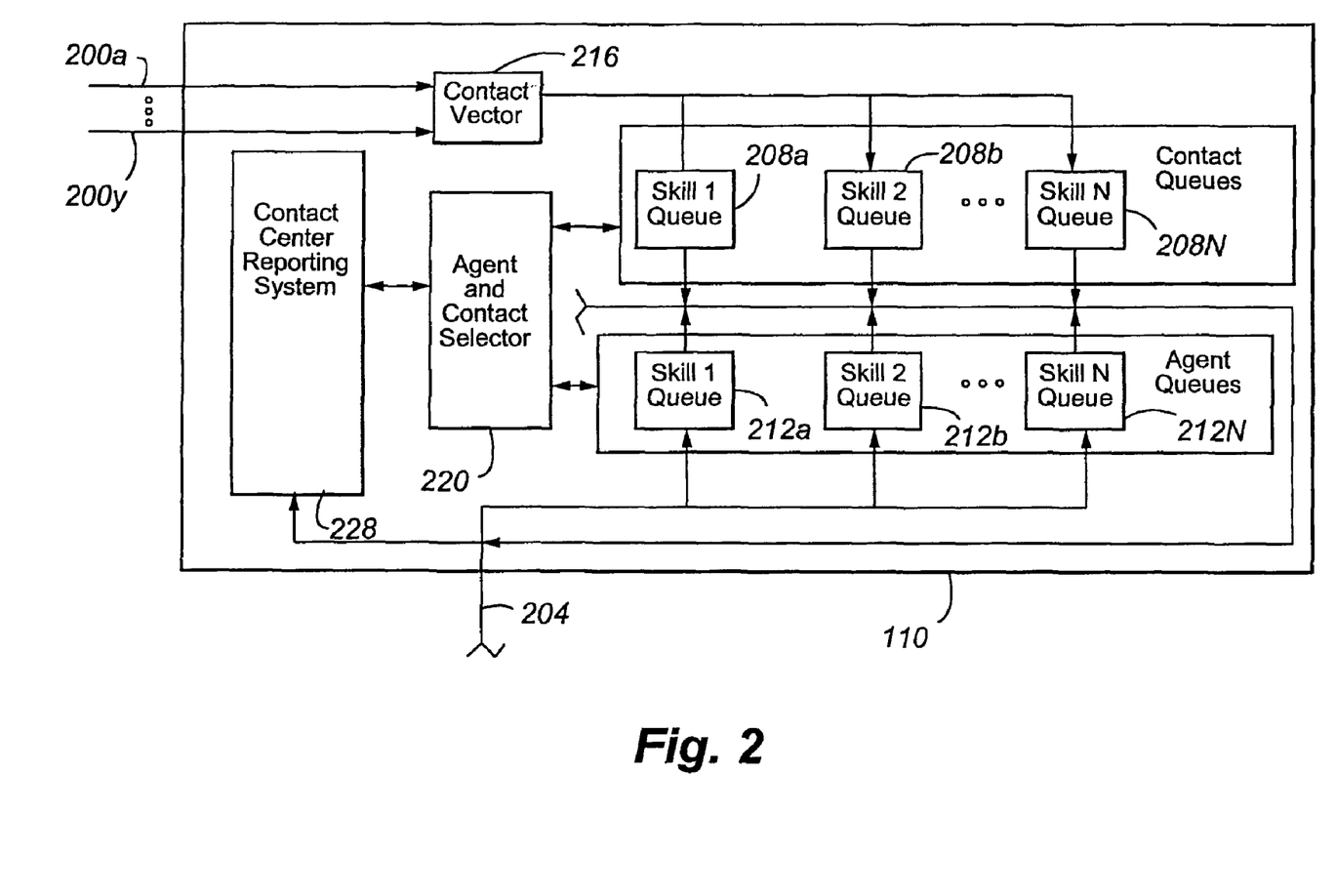
FIG. 2 is a block diagram of a server in the contact center according to an embodiment of the present invention.

Referring to FIG. 2, one possible configuration of the server 110 is depicted. The server 110 is in communication with a plurality of customer communication lines 200a-y (which are part of the packet-switched network 162 and can be one or more packet-switched links) and agent communication line 204 (which can be a voice-and-data transmission line such as LAN 142 and/or a circuit switched voice line). The server 110 includes a contact center reporting system 228, which is preferably a modified form of Avaya Inc.'s Operational Analyst™ or OA with On-Line Analytical Processing or OLAP technology, Basic Call Management System™ or BCMS, or Call Management System™ or CMS that gathers contact records and contact-center statistics for use in generating contact-center reports.

Referring to FIG. 2, included among the data stored in the server 110 is a set of logical work item queues 208a-n and a separate set of physical agent queues 212a-n. Each logical work item queue 208a-n corresponds to a different set of agent skills, as does each agent queue 212a-n. Included among the control programs in the server 112 is a work item or contact vector 216. Contacts incoming to the contact center are assigned by work item vector 216 to different work item queues 208a-n based upon a number of known criteria. Agents who are available for handling contacts are assigned to agent queues 212a-n based upon the skills that they possess. Skills-based ACD is described in further detail in U.S. Pat. Nos. 6,173,053 and 5,206,903, each of which is incorporated herein by this reference.

The packet-switched network 162 is in communication with an external customer telecommunication device 174 via a gateway 178, and the circuit-switched network 154 with an external customer telecommunication device 180.

It should be emphasized that the configuration of the switch, server, user telecommunication devices, and other elements as shown in FIG. 1 is for purposes of illustration only and should not be construed as limiting the invention to any particular arrangement of elements.

Figure 3:
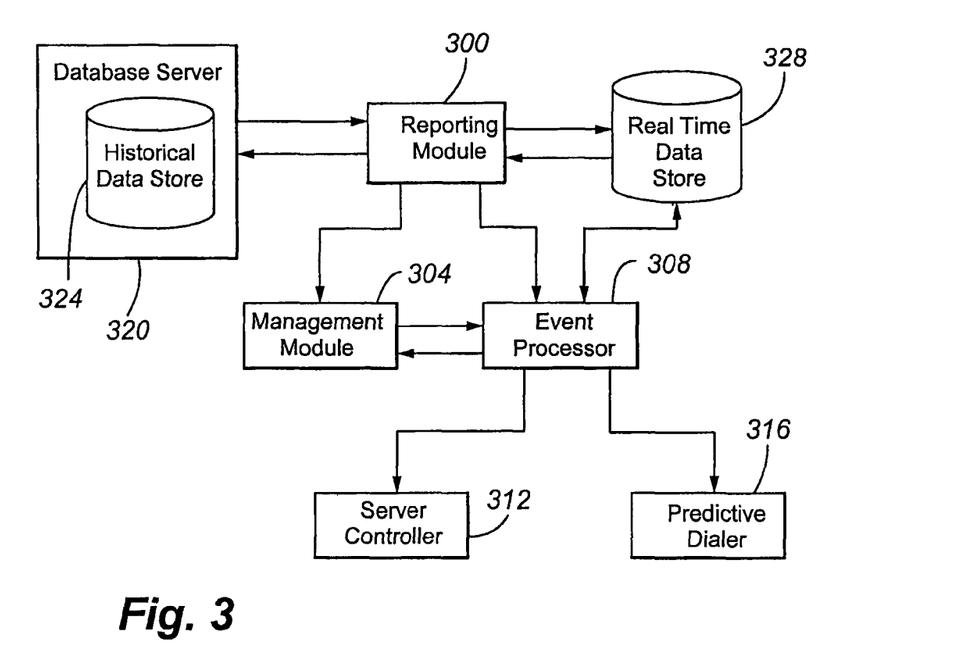
FIG. 3 is a block diagram of a contact center reporting system according to an embodiment of the present invention.

Referring now to FIG. 3, the contact center reporting system 228 includes a number of components. A reporting module 300 provides report presentation and delivery capabilities, retrieves data for historical reports directly from the database server 320, and receives real-time report data from an event processor 308. A management module 304 maintains the historical summary and detail data in the historical data store 324, persists detail and interval summary data from the event processor 308, rolls up data into daily summaries, and purges old data. The event processor 308 (which is in communication with the reporting module 300, management module 304, server 110 controller 312, and contact center predictive dialer 316) receives one or more event feeds (which provides details of activities in the contact center as they occur in real time, such as actions and state changes associated with an agent or a contact), maintains summaries of the reporting events in a real-time data store 328, provides access to that data for reporting and data export, and forwards the data to the management module 304 to be stored in the historical data store 324 for further processing.

The historical and real time data stores 324 and 328 are preferably configured as relational databases. The real-time data store 328 contains status and summary data about the managed entities and a subset of dimensional data to allow mapping between surrogate keys and natural keys. The data store 328 is organized around a number of base intervals, with exemplary intervals being 15, 30, or 60 minutes in duration. A current base interval contains tables with summary data of what has happened so far during the current interval and includes tables with current status of managed entities. A configurable number of previous base intervals is maintained. The immediately previous interval is transferred to the historical store 324 after the interval ends.

A number of entities or objects are typically tracked. The tracked objects include, for example, customer contacts including both inbound contacts from customers and outbound contacts to customers generated by the predictive dialer 316 (which may be circuit-switched and/or packet-switched calls, emails, instant messages, text chat, Short Message Service or SMS contacts, and Multimedia Message Service or MMS contacts), agents, contact queue 208, agent queue 212, split, skill, trunk, trunk group, Vector Directory Number, vector, and jobs. Characteristics of the objects may be searched, such as time duration (e.g., average talk time, average after call work or ACW time, average speed of answer, average time to abandon, wait time (actual or expected, etc.), number or count during a specified time interval (e.g., staffing levels, type of agents staffed, queue length or membership, ACD calls, etc.), usage levels, performance, status or state (e.g., active or abandoned, idle or busy, etc.), age (e.g., oldest call waiting, etc.), and percentage of contacts handled within prescribed service limits.

The event processor 308 is configured to provide actual and/or estimated real time cumulative data over a rolling, moving, or sliding window. A "rolling", "moving" or "sliding" window refers to a measured interval of a selected width or duration that moves with the passage of time relative to a fixed or stationary scale. By way of an example, a rolling window is used to monitor and/or analyze behavior occurring in the last thirty minutes, with the absolute time (e.g., 1:00 pm, 1:30 pm, etc.) being the fixed or stationary temporal scale.

In one configuration, objects are tracked precisely over defined intervals to produce an exact moving or rolling average using known mathematical techniques, i.e., the exact measure during, say, the most recent 30 minutes.

In another configuration, objects are tracked precisely over defined intervals to produce an exponential moving average, a double exponential moving average, an adaptive moving average, and the like using known mathematical techniques. This configuration may not fully address the problems encountered in monitoring contact center objects. The various algorithms are commonly designed for an existing time series and attempt to smooth out noise or extrapolate to predict future elements of the series. They may not address real time scales shorter than the measurement interval, i.e., they may not be concerned with the moment-to-moment value of the accumulator that is counting during the thirty-minute interval and all of the smoothing results may be for periods longer than the base interval. Using the methods to extrapolate the ratcheted data points may produce a static estimate that ignores the currently accumulating value.

A limitation of the above configurations can be the memory capacity required to effect the object tracking. In contact centers, tracking objects at this level of granularity can exceed the capacity of contact center software that is already sized to track millions of separate cumulative measures.

A preferred configuration of the present invention produces an estimate of the cumulative datum value over the rolling window (which in some cases is an estimate of the exact moving average) by combining (a) ratcheted cumulative data values over base intervals, if any, fully spanned by the rolling window, (b) the currently accumulated value for the cumulative datum over the present base interval, and (c) an estimated datum value in a prior partly spanned base interval using a time dependent weighting factor. It is generally applicable whenever the width of the moving window is an integer multiple of the base interval length, and can provide up-to-the-moment results with the information at hand. Stated another way, the estimate has two components. The first component includes the ratcheted values saved for each historic base interval and the current base interval accumulator value. The remainder of the moving window is approximated by taking the appropriate portion of the previous (partly spanned) base interval's results.

Figure 5:
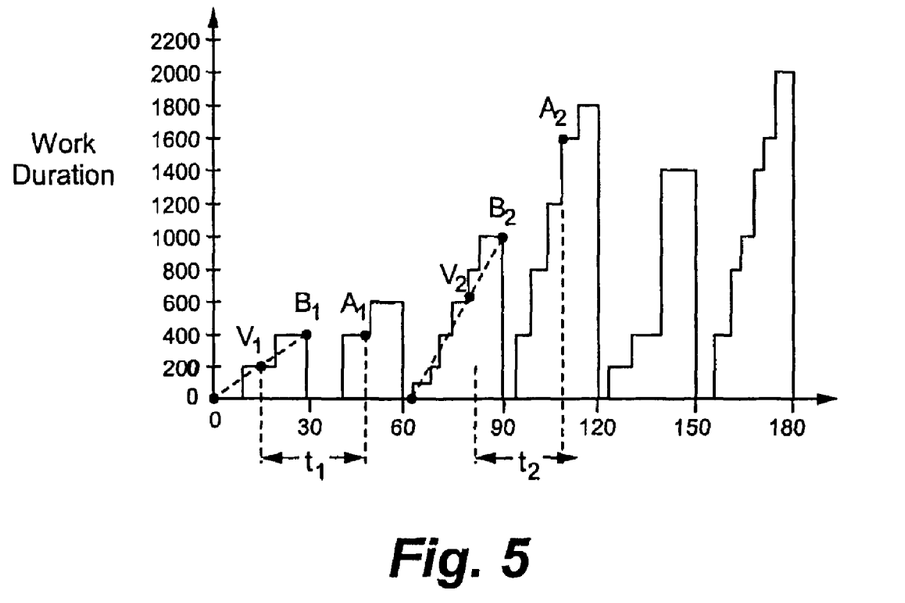
FIG. 5 is a plot of work duration (vertical axis) against time (minutes) (horizontal axis) showing an embodiment of the present invention.

This configuration will be illustrated with reference to FIG. 5 in which the base interval and rolling window widths are the same. In FIG. 5, the base interval is 30 minutes. The moving window, which at two different locations is represented by intervals $t_1$ and $t_2$, includes the current accumulator value (which for window $t_1$ is $A_1=400$ and for $t_2$ is $A_2=1600$) (or first component). Because the base interval and rolling window with are the same, there is no historic base interval value. If the window width were 180 minutes, for example, it would completely span, at any position, two historic base intervals, each with a corresponding (final) interval value. The second component is required because the depicted rolling windows each span only part of an historic base interval (i.e., window $t_1$ spans only part of the base interval 0 to 30 minutes and window $t_2$ spans only part of the base interval 60 to 90 minutes). To estimate the value to be used from the partially spanned interval, a linear or uniform rate of change of the base interval interval over the base interval are assumed. The sloping straight line is dashed for each of windows $t_1$ and $t_2$. The values "$B_1$" and "$B_2$" respectively represent the saved data at the end of the prior partly spanned base intervals. The values "$V_1$" and "$V_2$" respectively represent the point of intersection between a vertical line passing through the window's starting point and the corresponding dashed line. The differences "$B_1-V_1$" and "$B_2-V_2$" respectively constitute the second component of the estimation in a configuration of the invention. Stated another way, a weighting factor is multiplied against the final base interval value (which is $B_1=400$ for window $t_1$ and $B_2=1,000$ for window $t_2$). For window $t_1$ the weighting factor is 0.5 (which provides a value of 200 and for window $t_2$ is 0.35 (which provides a value of 350). The complete estimate (both components) is 600 and 2,050 respectively for $t_1$ and $t_2$.

Where the widths of the base interval and rolling window are the same, the following equation is employed:

Cumulative Datum Value over Window = Current Base Interval Datum Value + Weighting Factor*Previous Base Interval Datum Value.

As noted, the weighting factor decreases linearly with time from a value of one at the start of the current interval until it reaches zero at the end of that interval. It therefore represents the fractional time remaining in the current interval. For example, if the base interval is 30 minutes and the accumulator is 20 minutes into the current base interval, then only a 10 minute portion of the previous base interval is appropriate so the weighting factor would be $^{10}/_{30}$ or 0.333. The weighting factor insures that effective portion of the previous interval (e.g., 10 minutes) plus the actual time of the current interval (e.g., 20 minutes) always sums to the desired rolling window size (e.g., 30 minutes). The real time value or result determined by this approach equals the exact moving average at times that coincide with the fixed interval boundaries and at other times it represents an approximation in which the contribution from the current interval is exact (moment by moment) but the contribution from the previous, partly spanned interval is diminished smoothly (as through events that happened during that interval had arrived uniformly over time).

Figure 6:
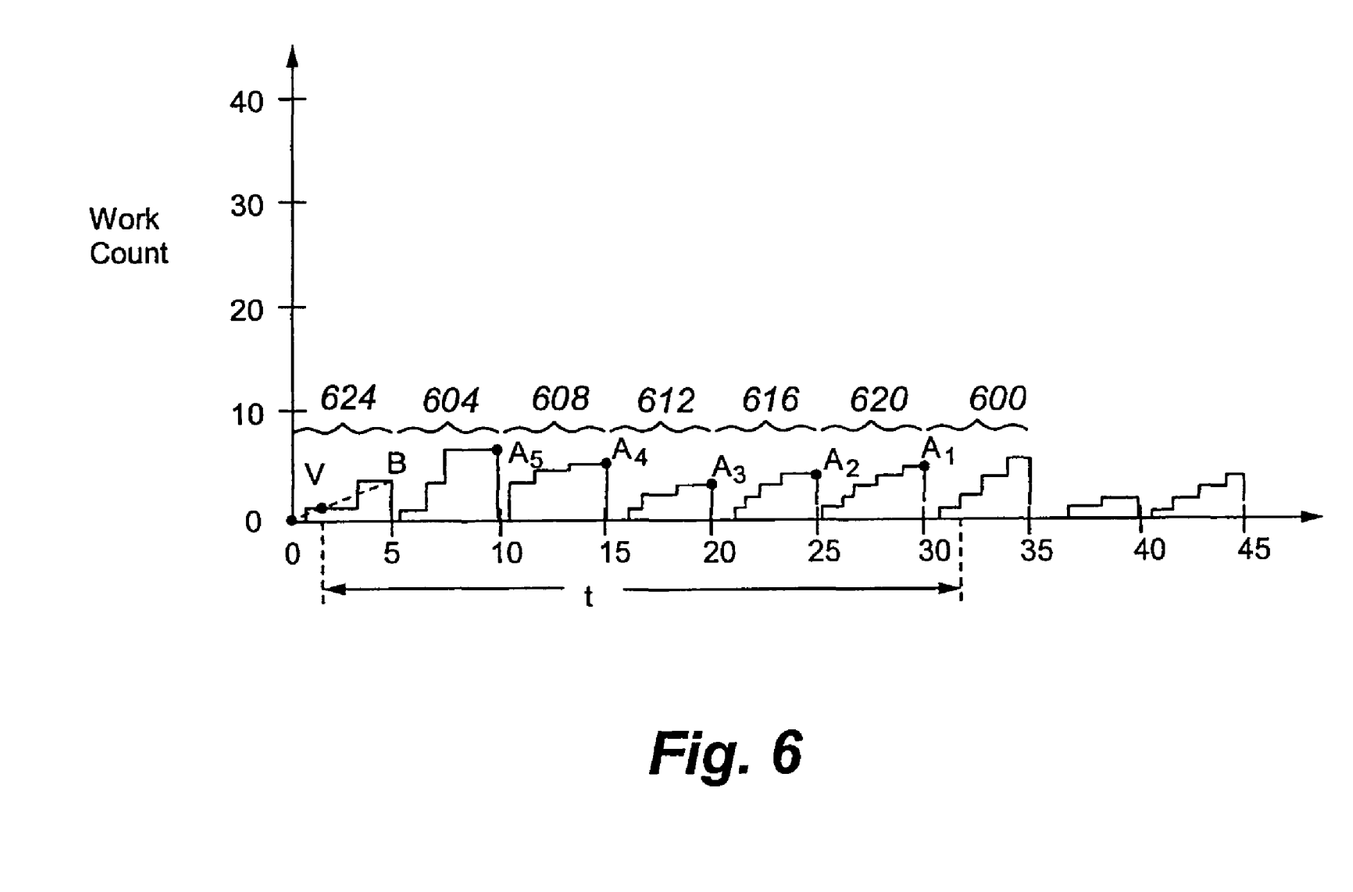
FIG. 6 is a plot of work count (vertical axis) against time (minutes) (horizontal axis) showing an embodiment of the present invention.

This configuration will be further illustrated with reference to FIG. 6 in which the base interval and rolling window widths are different. The base interval width (5 minutes) is less than but is an integer multiple of the rolling window width (30 minutes). The moving window, which at one location is represented by the interval t, includes the current accumulator value (which for base interval 600 is 2) and the values in the base intervals 604 (6), 608 (5), 612 (3), 616 (4), and 620 (5) (or a value of 25 for the first component). The second component is required because the depicted rolling window spans only part of a historic base interval (i.e., window $t_1$ spans only two-thirds of the base interval 624). To estimate the value to be used from the partially spanned interval 624, a straight line and a uniform rate of change of the base interval over the base interval are assumed. The straight line is dashed for the depicted rolling window. The value "$V_1$" represents the point of intersection between a vertical line passing through the window's starting point and the corresponding dashed line. Stated another way, a weighting factor is multiplied against the final base interval value (which is $B_1=3$ for the depicted window). For the depicted window, the weighting factor is 0.667 (which provides a value of 2 for the second component). The complete estimate is therefore 25+2=27.

Where the widths of the base interval and rolling window are different, the following equation is employed:

Cumulative Datum Value over Rolling Window=Current Base Interval Datum Value+ First Previous Base Interval Datum Value+Second Previous Base Interval Datum Value+ . . . + $N-1$th Previous Base Interval Datum Value+ Weighting Factor*$N$th Previous Base Interval Datum Value.

Again, the result agrees with the exact rolling average at times that coincide with the base interval boundaries, and its only approximation is in the treatment of the Nth previous interval's contribution, which is generally a smaller proportion of the total; hence, the approximation is generally fairly accurate. In this example, the 30 minute estimate at each 5 minute boundary.

Figure 8:
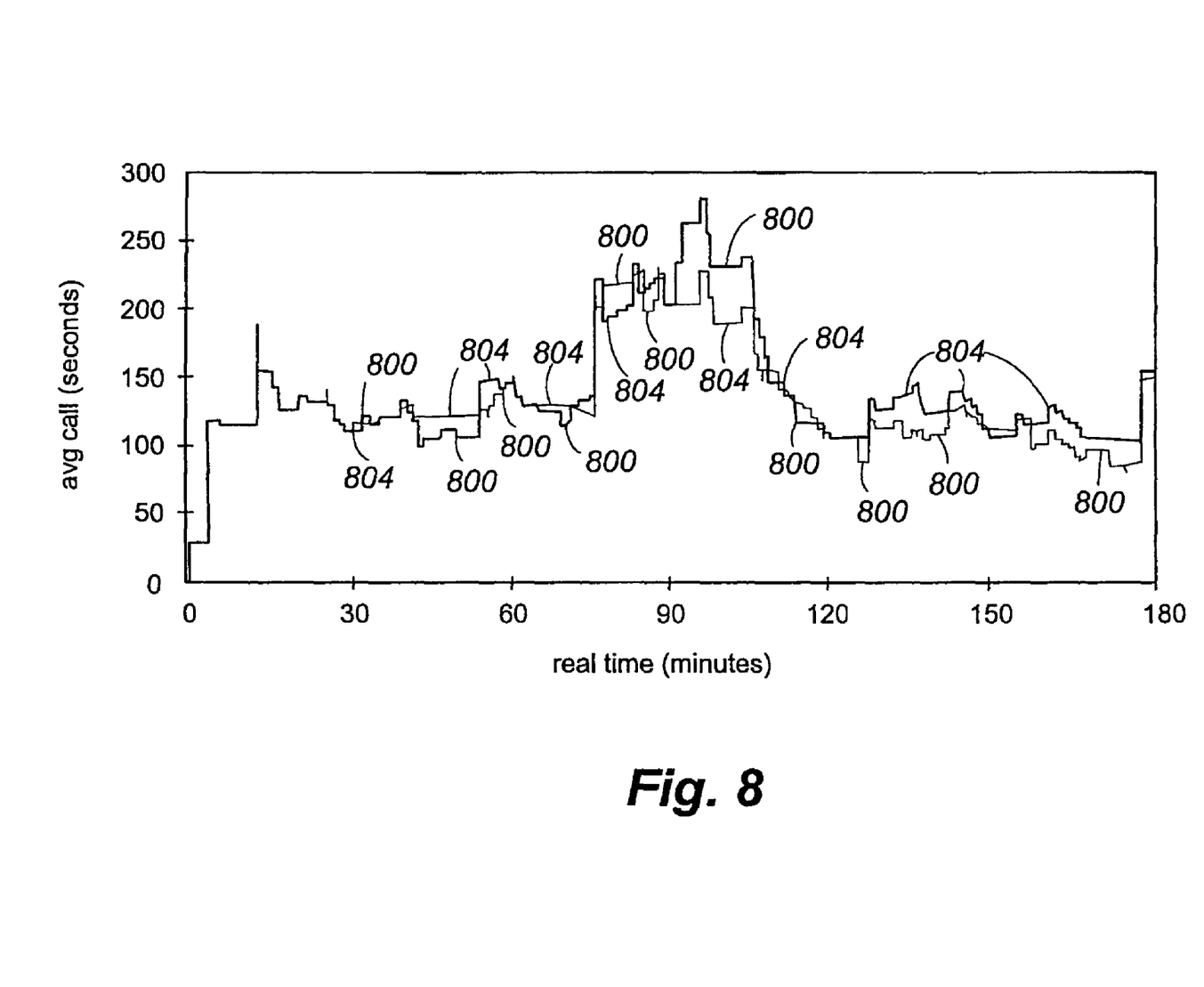
FIG. 8 is a plot of average call length (seconds) (vertical axis) against time (minutes) (horizontal axis) contrasting an estimation technique of the present invention against a rolling average.
Figure 9:
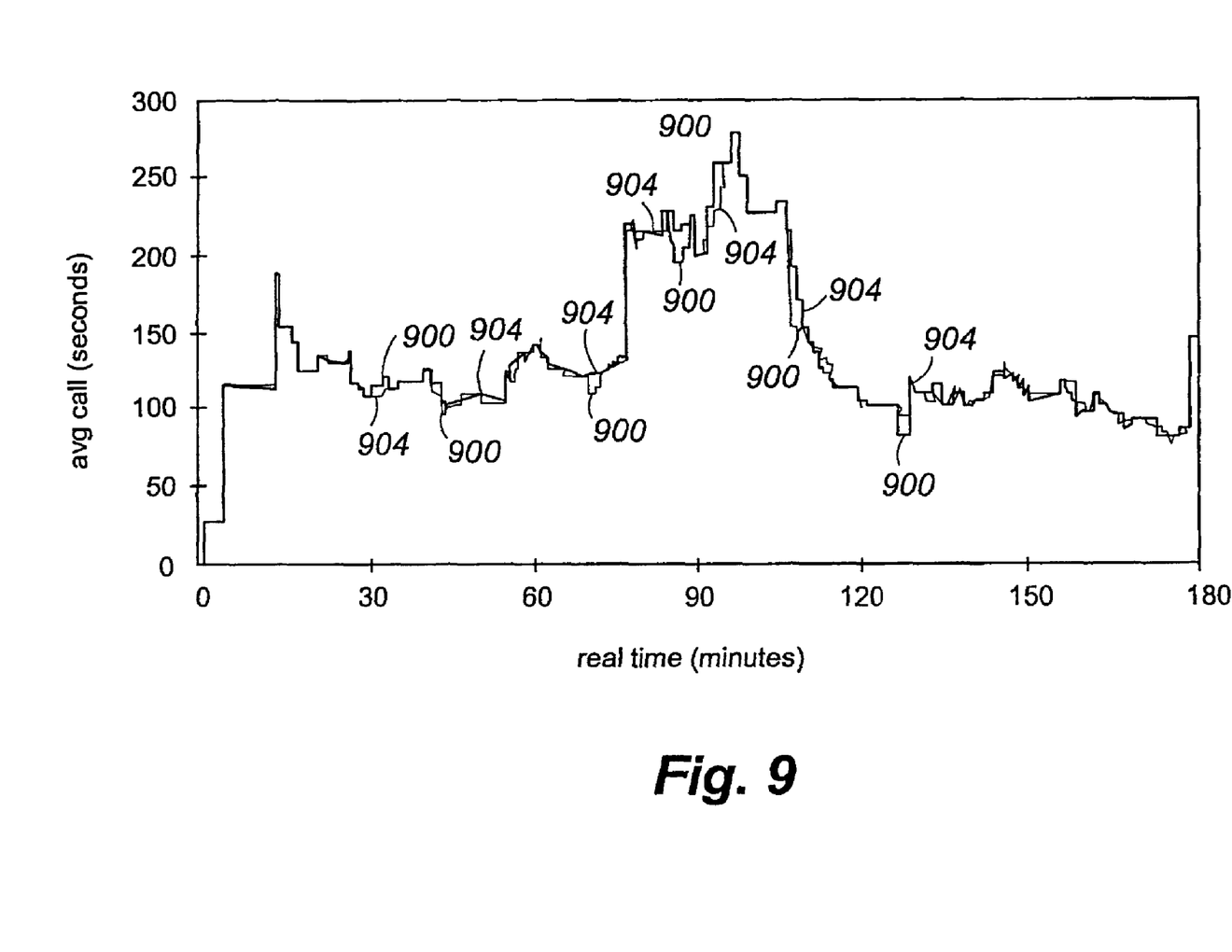
FIG. 9 is a plot of average call length (seconds) (vertical axis) against time (minutes) (horizontal axis) contrasting an estimation technique of the present invention against a rolling average.

The accuracy of the approximation is depicted with reference to FIGS. 8 and 9 where the rolling average is determined over a 180 minute period. FIGS. 8 and 9 are each a plot of average call length (seconds) against real time (minutes) for a rolling window of 30 minutes. In FIG. 8, the base interval width is 30 minutes, but in FIG. 9 the base interval width is 5 minutes. The actual rolling average is denoted by mathematical relationships 800 and 900 while the approximation produced by the above configuration is denoted by mathematical relationships 804 and 904. As can be seen from the two mathematical relationships, both approximations are quite close to the actual rolling average. It also shows that the approximation improves when multiple base intervals are used (904 is better than 804).

In yet another configuration, approximations are further improved by using adjacent previous results (i.e., the N−1th and N+1th) to infer a nonuniform arrival rate for events in the Nth previous interval. For example, arrival rates that grow or peak during the interval could be inferred from known interpolation and/or extrapolation techniques, such as polynomial interpolation or regression analysis, and the inferred arrival rate could be used to alter the time dependent weighting factor. This variation of the invention could apply best to situations in which adjacent previous values are expected to be correlated.

In yet a further configuration, a mathematical relationship characterizing the distribution of values over the base interval or subinterval is determined by known curve fitting mathematical techniques and a descriptor of the (best) fit mathematical relationship is saved along with the final value for the base interval or subinterval. This configuration can be used in connection with the prior configuration.

Figure 7:
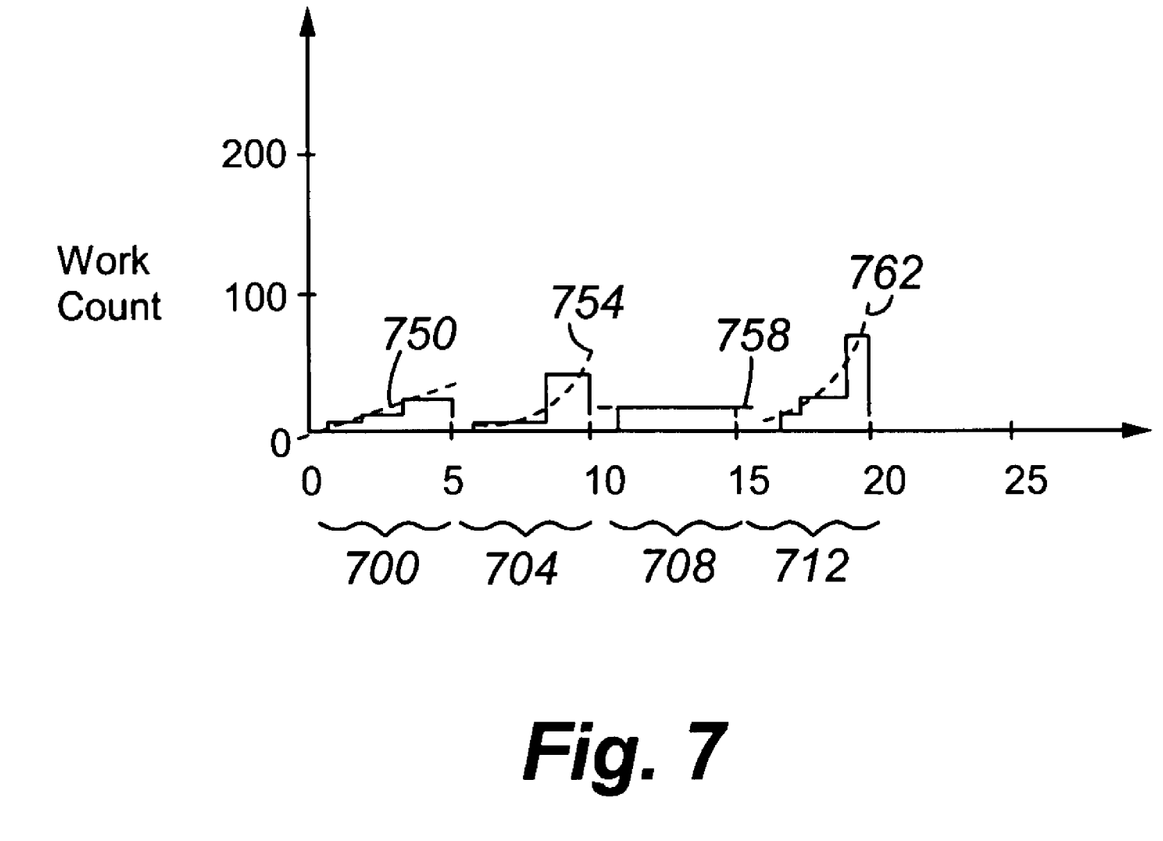
FIG. 7 is a plot of work count (vertical axis) against time (minutes) (horizontal axis) showing an embodiment of the present invention.

FIG. 7 exemplifies this configuration. The base interval is 5 minutes. Over the base interval 700 the "best fit" mathematical relationship is a straight line 750, over the interval 704 the "best fit" mathematical relationship is a parabolic curve 754, over the interval 708 the "best fit" mathematical relationship is a horizontal line 758, and over the interval 712 the "best fit" mathematical relationship is a parabolic curve 762. Additionally a key characteristic of the mathematical relationship may be saved, such as the slope and intercept of the straight line and the three coefficients of the parabola.

A number of variations and modifications of the invention can be used. It would be possible to provide for some features of the invention without providing others.

For example, the server and/or switch can be a software-controlled system including a processing unit (CPU), microprocessor, or other type of digital data processor executing software or an Application-Specific Integrated Circuit (ASIC) as well as various portions or combinations of such elements. The memory may be a random access memory (RAM), a read-only memory (ROM), a relational database value, or combinations of these and other types of electronic memory devices.

The present invention is not limited to contact center objects but may be used to determine rolling average estimates for any situation in which cumulative data is monitored in real time. For example, the present invention could be used to estimate the number of cars passing a particular traffic monitoring point, assembly line production controllers, financial forecasting, or the number of photons counted by a microscopic light detector.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A contact center monitoring method to estimate and track real time data from ratcheted data, the contact center comprising a processor, memory, a plurality of agents and work item queues and a workflow server for distributing work items to available agents, wherein the contact center manages data with ratcheting, comprising:

the processor selecting a base time interval for accumulating current datum, wherein the base time interval begins at a time A ($t_A$) and ends at a time A+a duration for the base time interval ($t_A$+duration), wherein the time A is a moment in time, wherein the base time intervals repeat at time $t_A$+duration;

the processor receiving real time contact center data, for each base time interval;

the processor accumulating the real time data, for each base time interval;

the processor storing the accumulated real time data, for each base time interval, the data including a status and a summary data;

the processor, at the end of each previous base time interval, ratcheting the accumulated and stored data to produce a summary datum value;

the processor storing the a summary datum value;

the processor deleting the accumulated real time data;

the processor providing an up to the moment cumulative result in real time by performing the following steps:

the processor selecting a width of a rolling window, wherein the rolling window starts at time 1 ($t_1$) and ends at time 1 ($t_2$), wherein the width of the rolling window being at least one of (i) equal and (ii) greater than the base time interval and being an integer multiple of the base time interval;

the processor determining that the rolling window partly spans a current base time interval;

the processor determining a value for datum in the partly spanned current base interval;

the processor determining that the rolling window partly spans a prior base time interval, wherein partly spanning the prior base time interval means that $t_1$ of the rolling window occurs after before the current time ($t_A$) of the present base time interval;

the processor determining that the rolling window partly spans a prior base time interval, wherein partly spanning the prior base time interval means that $t_1$ of the rolling window occurs after before the current time $t_A$ of the present base time interval;

the processor estimating a value for datum in the partly spanned prior base time interval by multiplying the summary value for the prior base time interval by a time dependent weighting factor, wherein the weighting factor is determined by the position of $t_1$ of the rolling window in the prior base time interval, and wherein the weighting factor decreases with time;

providing said cumulative result by combining at least said value for datum in the partly spanned current base time interval and the estimated value for datum in the partly spanned prior base time interval;

wherein the result is a cumulative value under the rolling window; and comparing the cumulative result against a threshold to at least automatically trigger a notification or corrective action.

2. The method of claim 1, wherein the weighting factor decreases linearly with time from a value of one (1) at $t_A$ to $t_A$+duration.

3. The method of claim 2, wherein when the rolling window partly spans a prior base time interval, the processor determining a rolling average for the cumulative datum over the width of the rolling window, and wherein the rolling average is at least one of a moving average, an exponential moving average, a double exponential moving average, and an adaptive moving average.

4. The method of claim 1, further comprising: maintaining the width of the rolling window constant in magnitude as it progressively spans a plurality of successive base time intervals.

5. The method of claim 4, wherein the rolling window partly spans a current base time interval and the cumulative datum in the current base time interval has a currently accumulated value and further comprising:
determining an estimate for the cumulative datum over the rolling window according to the following equation:

Cumulative datum value over rolling window=currently accumulated value+(weighting factor)(cumulative datum value over the partly spanned prior base time interval).

6. The method of claim 4, wherein the rolling window partly spans a current base time interval and at least one intermediate base time interval having a respective cumulative datum value and the cumulative datum in the current base time interval has a currently accumulated value and further comprising:
determining an estimate for the cumulative datum over the rolling window according to the following equation:

Cumulative datum value over rolling window=currently accumulated value+cumulative datum value for the at least one intermediate base time interval+(weighting factor)(cumulative datum value over the partly spanned prior base time interval).

7. The method of claim 6, wherein the weighting factor is related to an amount of time remaining in the current base time interval and wherein the weighting factor is greater than zero and less than one.

8. The method of claim 4, wherein the estimation is based, at least in part, on a cumulative datum value in at least one adjacent base time interval.

9. The method of claim 4, further comprising:
at least one of interpolating and extrapolating a mathematical relationship indicating a distribution of datum values over a base time interval; and
storing with the base time interval's cumulative datum value, a descriptor of the mathematical relationship.

10. The method of claim 1, wherein the datum is related to one or more of the following: customer contact(s), agent(s), contact queue(s), agent queue(s), split(s), skill(s), trunk(s), trunk group(s), Vector Directory Number(s), and vector(s).

11. A method, comprising:
a processor managing cumulative data with ratcheting;
the processor selecting a base time interval for accumulating current datum, wherein the base time interval begins at a time A ($t_A$) and ends at a time A+a duration for the base time interval ($t_A$+duration), wherein the time A is a moment in time, wherein the base time intervals repeat at time $t_A$+duration;
the processor receiving real time contact center data, for each base time interval;
the processor accumulating the real time data, for each base time interval;
the processor storing the accumulated real time data, for each base time interval, the data including a status and a summary data
the processor, at the end of each previous base time interval, ratcheting the accumulated and stored data to produce a summary datum value;
the processor storing the a summary datum value;
the processor deleting the accumulated real time data;
the processor providing an up to the moment cumulative result in real time by performing the following steps:
the processor selecting a width of a rolling window, wherein the rolling window starts at time 1 ($t_1$) and ends at time 1 ($t_2$), wherein the width of the rolling window being at least one of (i) equal and (ii) greater than the base time interval and being an integer multiple of the base time interval;
the processor determining that the rolling window partly spanning a prior base time interval, wherein partly spanning the prior base time interval means that that $t_1$ of the rolling window occurs after before the current time ($t_A$) of the present base time interval;
the processor determining that the rolling window also partly spanning a current base time interval, wherein partly spanning the current base time interval means that $t_2$ of the rolling window occurs after $t_A$ but before $t_A$+duration;
the processor determining a value for datum in the partly spanned current base interval;
the processor determining an estimate for the cumulative datum over the rolling window according to the following equation:

Cumulative datum value over rolling window=currently accumulated value+cumulative datum value for any intermediate base time interval+(weighting factor)(cumulative datum value over the partly spanned prior base time interval), wherein the currently accumulated value is for a current base time interval; and comparing the cumulative result against a threshold to at least automatically trigger a notification or corrective action.

12. The method of claim 11, wherein the weighting factor is related to an amount of time remaining in the current base time interval and wherein the weighting factor is greater than zero and less than one.

13. The method of claim 11, wherein the datum is related to one or more of the following: customer contact(s), agent(s), contact queue(s), agent queue(s), split(s), skill(s), trunk(s), trunk group(s), Vector Directory Number(s), and vector(s).

14. A contact center, comprising:
a processor;
a memory;
a plurality of agent and work item queues;
a workflow server in communication with the plurality of agents, the workflow server operable to distribute work items to available agents; and
an event processor operable to manage cumulative data with ratcheting and operable to:
a base time interval for accumulating current datum, wherein the base time interval begins at a time A ($t_A$) and ends at a time A+a duration for the base time interval ($t_A$+duration), wherein the time A is a moment in time, wherein the base time intervals repeat at time $t_A$+duration;
receive real time contact center data, for each base time interval;
accumulate the real time data, for each base time interval;

store the accumulated real time data, for each base time interval, the data including a status and a summary data;

ratchet the accumulated and stored data to produce a summary datum value at the end of each previous base time interval;

store the a summary datum value;

delete the accumulated real time data;

provide an up to the moment cumulative result in real time by performing the following steps:

selecting a width of a rolling window, wherein the rolling window starts at time 1 ($t_1$) and ends at time 1 ($t_2$), wherein the width of the rolling window being at least one of (i) equal and (ii) greater than the base time interval and being an integer multiple of the base time interval;

determining if there are any intermediate base time intervals over the width of the rolling window between a first base time interval and a current base time interval;

determining that if there is an intermediate time interval and when the rolling window partly spans a prior base time interval, determine an estimate for the cumulative datum over the rolling window according to the following equation:

Cumulative datum value over rolling window=currently accumulated value+cumulative datum value for the at least one intermediate base time interval+(weighting factor)(cumulative datum value over the partly spanned prior base time interval); and determining that if there is no intermediate time interval and when the rolling window partly spans a prior base time interval, determine an estimate for the cumulative datum over the rolling window according to the following equation:

Cumulative datum value over rolling window=currently accumulated value+(weighting factor)(cumulative datum value over the partly spanned prior base time interval); and comparing the cumulative result against a threshold to at least automatically trigger a notification or corrective action.

15. The contact center of claim 14, further comprising determine a rolling average for the cumulative datum over the width of the rolling window.

16. The contact center of claim 15, wherein the rolling average is at least one of a moving average, an exponential moving average, a double exponential moving average, and an adaptive moving average.

17. The contact center of claim 14, wherein the weighting factor decreases linearly with time from a value of one (1) at $t_A$ to $t_A$+duration.

18. The contact center of claim 14, wherein the weighting factor is related to an amount of time remaining in the current base time interval and wherein the weighting factor is greater than zero and less than one.

19. The contact center of claim 17, wherein the estimation is based, at least in part, on a cumulative datum value in at least one adjacent base time interval.

20. The contact center of claim 17, wherein the event processor is further operable to at least one of interpolate and extrapolate a mathematical relationship indicating a distribution of datum values over a base time interval; and store, with the base time interval's cumulative datum value, a descriptor of the mathematical relationship.

21. The contact center of claim 14, wherein the datum is related to one or more of the following: customer contact(s), agent(s), contact queue(s), agent queue(s), split(s), skill(s), trunk(s), trunk group(s), Vector Directory Number(s), and vector(s).

* * * * *